(12) United States Patent
Bauer

(10) Patent No.: US 9,058,484 B2
(45) Date of Patent: Jun. 16, 2015

(54) METHOD FOR CHECKING WHETHER PROGRAM INSTRUCTIONS HAVE BEEN EXECUTED BY A PORTABLE END DEVICE

(75) Inventor: Sven Bauer, Vaterstetten (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 270 days.

(21) Appl. No.: 13/697,161

(22) PCT Filed: May 6, 2011

(86) PCT No.: PCT/EP2011/002269
§ 371 (c)(1),
(2), (4) Date: Nov. 9, 2012

(87) PCT Pub. No.: WO2011/141143
PCT Pub. Date: Nov. 17, 2011

(65) Prior Publication Data
US 2013/0060939 A1    Mar. 7, 2013

(30) Foreign Application Priority Data

May 10, 2010    (DE) .......................... 10 2010 019 995

(51) Int. Cl.
G06F 9/445    (2006.01)
G06F 9/44    (2006.01)
G06F 21/54    (2013.01)

(52) U.S. Cl.
CPC ........ *G06F 21/54* (2013.01); *G06F 2221/2101* (2013.01); *G06F 2221/2123* (2013.01)

(58) Field of Classification Search
None
See application file for complete search history.

(56) References Cited

U.S. PATENT DOCUMENTS

| 7,191,464 B2 | 3/2007 | Cromer et al. |
| 2001/0027383 A1 * | 10/2001 | Maliszewski ................. 702/188 |
| 2008/0022108 A1 | 1/2008 | Brannock et al. |
| 2010/0146624 A1 | 6/2010 | Meyer et al. |

FOREIGN PATENT DOCUMENTS

| DE | 10 2007 038 763 A1 | 2/2009 |
| WO | 2005/024605 A1 | 3/2005 |

OTHER PUBLICATIONS

Grabher et al: "Non-deterministic processors" Proceedings of the 4th Workshop on Embedded Systems Security, WES '09, New York, New York pp. 1-10 (Jan. 1, 2009).
Chang et al: "Protecting Software Code by Guards", Lecture Notes in Computer Science, Springer, DE, vol. 2320, pp. 160-175 (Jun. 10, 2002).
International Preliminary Report on Patentability & Written Opinion for PCT/EP2011/002269, Nov. 13, 2012.
International Search Report for PCT/EP2011/002269, Aug. 5, 2011.

* cited by examiner

*Primary Examiner* — Chuck Kendall
(74) *Attorney, Agent, or Firm* — Workman Nydegger

(57) ABSTRACT

A method and a system for checking whether program instructions have been executed by an end device, wherein, the end device calls for program instructions and the program instructions are stored in executable form in a trustworthy entity, in particular a chip card. Subsequently, the program instructions are variably modified in the trustworthy entity such that the modified program instructions vary upon each execution of the method. Through execution of the instructions in the end device there is obtained a check value which is in turn transferred to the trustworthy entity and verified in the trustworthy entity.

15 Claims, 2 Drawing Sheets

METHOD FOR CHECKING WHETHER PROGRAM INSTRUCTIONS HAVE BEEN EXECUTED BY A PORTABLE END DEVICE

BACKGROUND OF THE INVENTION

A. Field of the Invention

This invention relates to a method and a system for checking whether program instructions have been executed by a portable end device.

B. Related Art

With the increasing spread of electronic end devices, in particular end devices such as for example mobile radio devices, PDAs, tablet PCs, smartphones, etc., there is increased processing on these end devices of personal, confidential, secret data and/or at least data with sensitive content. These data include in particular a user's secrets, for example authorization data, access data, personal identification numbers, payment transaction data, in particular TANs and credit card numbers. If these data are spied out by an attacker, this leads in many cases to financial or personal damage.

In a way comparable to the attack methods on a conventional PC with an Internet connection, the portable end device is more and more frequently becoming the attack target, for example by means of spy software. Hence, the data on such end devices should be subject to a maximum protection, so that spy attacks on such data are fruitless.

A spy attack is achieved by implanting harmful third-party program instructions, for example through so-called Trojans, viruses or worms as malware. Hence, it is necessary that the portable end device checks the respective program instructions to be executed in order to recognize an implanting of the third-party program instruction and to initiate defensive actions, where applicable. The check of the program instructions to be executed can take place here before, during or after the actual execution of the program instructions to be checked.

Program instructions are understood according to the invention to be a sequence of machine-readable instructions, statements and/or commands which a computing unit, in particular a CPU, of a portable end device can execute and process. It is not essential to the invention here whether the program instructions are present as machine code, byte code or source code or whether a compiler or interpreter is inserted as a translating entity for their execution in the CPU.

From the prior art, checking methods for program instructions are known. According to the U.S. Pat. No. 7,191,464-B2 a check is already carried out during the execution of the start program instruction of an end device, the so-called boot code. The program instructions are subdivided here into portions, each portion of program instructions checking for integrity the portion of program instructions to be executed next before it passes control of this next portion to the end device.

A problem of this procedure is that the first portion of program instructions must be trustworthy, because this first portion itself is not checked. This can be solved for example by storing the first portion of the program instructions in a special component, for example a ROM memory, because a ROM memory can no longer be changed after the initial writing. However, this rules out any subsequent updating of the first portion, for example by means of software patches.

In US-2008/0022108-A1 there is again described a method for checking a first portion of program instructions. Here, there is calculated on the basis of the portion of the program instructions a random cryptographic function which is verified in a separate and external cryptographic hardware unit before execution of the portion of the program instructions. In this case it is impossible to do without the separate unit located outside the system.

SUMMARY OF THE DISCLOSURE

The invention is hence based on the object of providing a method and a system for checking whether program instructions have been executed by an end device that is simple and secure and that can be realized cost-efficiently. At the same time, this check should not be predictable and not be resource-intensive. At the same time, it should be inessential at which point in time program instructions and which portion of program instructions must already have been checked. A partial object here is to utilize existing hardware infrastructure of the end device.

According to the invention there is hence proposed a method for checking whether program instructions have been executed by an end device wherein the program instructions are called for by the end device, the program instructions being stored in executable form in a trustworthy entity, in particular a chip card. The storing is preferably effected in a volatile memory area of the trustworthy entity, in particular a flash memory. The calling is preferably effected here via an existing communication connection between end device and the trustworthy entity.

The calling step is followed by the step of variably modifying the executable program instructions by the trustworthy entity in such a way that the modified program instructions vary upon each execution of the method. This variable modifying basically means that the program instruction is modified differently upon each execution of the method according to the invention. This means that an alternative modification takes place upon repeated execution of the method according to the invention for checking the same program instruction.

The original effect which the execution of the non-modified program instructions has on the end device is not altered by the modification of the program instruction. There can arise additional effects, for example an obtained check value, due to the modification of the program instructions, these additional effects serving to check the executing of the program instructions.

Subsequently, the modified program instructions are transferred from the trustworthy entity to the end device and executed by the end device, there being obtained by the executing of the modified program instructions a check value. This check value is obtained due to the modification of the program instructions. This check value is in turn transferred from the end device to the trustworthy entity and verified in the trustworthy entity for checking whether the called for program instructions have been executed in the end device.

By this method it is advantageously achieved that the program instructions to be executed are individually modified before each executing. No prediction on the part of an implanted third-party influence is thus possible, because the execution of the modified program instructions necessarily leads to an individual check value. Third-party program instructions implanting themselves in the program instructions due to spy attacks do not know the check value to be obtained or lead to a false check value being obtained, so that the check on the basis of the check value within the trustworthy entity yields that it was not the called for program instructions that were executed.

In one embodiment of the method, the program instructions to be executed are transferred from the end device to the trustworthy entity before they are called for. Thus, the program instructions are stored in the trustworthy entity only temporarily and for the purpose of modifying. As a result, the memory requirement in the trustworthy entity is reduced and proper checking nevertheless guaranteed.

Advantageously, the obtained check value is compared in the trustworthy entity with an expected value stored before the transferring of the modified program instructions, and in case of a match between check value and expected value the check yields that the called for program instructions have been executed by the end device.

To increase the security and reduce the executing time of the check, in one embodiment only portions of the program instructions are called for by the end device. Upon each execution of the method according to the invention, different portions of the program instructions stored in the trustworthy entity can be called for. The selection of the portions to be called for can be random. These portions can in particular also be beginning program instructions, so that the integrity of a portion that is at the beginning of many portions of program instructions can be securely checked by the method according to the invention.

In an advantageous embodiment, the variable modification is effected such that an executable check instruction is incorporated into the program instruction. This check instruction delivers upon the executing of the modified program instruction the check value which is used for verifying in the trustworthy entity. The trustworthy entity likewise executes this check instruction and stores the result of the check instruction as an expected value. In particular, algorithmic computations, signatures of non-modified or modified portions of the called for program instruction, cryptographic computations can be incorporated as a check instruction. The check instruction is in particular different upon each modification. By way of example, a check instruction is an executable hash algorithm, there being obtained as a check value a computed hash value of a certain portion, in particular the modified program instructions.

It is likewise embraced by the idea of the invention that program instructions not called for are checked by means of the modified program instructions. For example, modified program instructions are transferred to the end device, they are executed by the end device, and through the additional effect of the modification there can be checked program instructions already executed or there can be checked effects that must be present through program instructions already executed, in particular software routines, interface configurations or access rights. Implanted third-party program instructions through malware can be recognized in this way.

In an advantageous embodiment, the variable modification of the program instructions is effected through incorporating of a variable value, in particular a random value. This variable value is obtained as a check value through executing of the modified program instructions by the end device and verified in the trustworthy entity. Alternatively, a hash function is executed on the variable value through the modifying, and a hash value of the variable value is transferred as the obtained check value. Likewise, there can be obtained as the check value a hash value of a program instruction yet to be executed or already executed.

Alternatively, the variable modification is effected through incorporating of a random number of idle instructions, also known as idle tasks or NOPs, at a certain place or different places of the called for program instructions. The number, the place or a hash value of portions of the program instruction containing these idle instructions then serve as the check value to be verified. Alternatively, there can also be inserted program instructions without any targeted effect, so-called nonsense commands, also designated junk instructions.

A further increase in security is obtained by the variable modifying being effected through randomizing of the called for portions of the program instructions. An obtained check value is then for example the hash value or the signature of the randomized data stream which was also calculated and stored as an expected value by the trustworthy entity.

In an alternative embodiment, the program instruction is variably modified such that after the executing of the modified program instruction in the end device the transfer of the obtained check value is effected in cryptographically encrypted form, the trustworthy entity being able to decrypt the obtained check value. For this purpose, in particular the public part of a key pair is transferred as part of the modified program instruction. Upon execution of the modified program instruction the end device is requested to employ the public part of the key for cryptographically encrypting the transfer between end device and trustworthy entity. The obtained check value is either transferred encrypted with the key, or the resulting encrypted transfer is the check value, because the private key matching the public key is stored in the trustworthy entity and is provided for decrypting the data transferred in encrypted form. If decrypting is not possible, the called for program instructions are considered not executed.

In one embodiment, an action is authorized by the trustworthy entity in consequence of the verifying. Conceivable actions are in particular network accesses, authentications, creations of signatures or the like.

In one embodiment, the called for program instructions are the start program instructions, the so-called boot code of the end device. The calling for the start program instructions is effected during the boot and/or after the boot of the end device. Through this measure, third-party program instructions of malware are prevented from being implanted at an early stage, or such implanting can be discovered at an early stage.

In a special embodiment, the end device is a mobile radio end device and the trustworthy entity a Subscriber Identification Module, a so-called SIM. The transferring of the modified program instruction as well as of the obtained check value is effected here via an existing communication connection between Subscriber Identification Module and mobile radio end device, for example via ISO 7816 or an ISO 14443 connection.

In an alternative embodiment, the trustworthy entity is a server of a network operator, an intelligent memory card, for example an MMC, mini SD, µSD, USIM or a smart card or purely based on software as a Trusted Platform Module, or TPM for short, within an operating system kernel. The trustworthy entity can additionally have further functional units, such as computing units, communication interfaces of different standards.

Further, there is proposed a system for executing the method according to the invention, the system having a trustworthy entity with a means for storing program instructions for execution in the end device, a means for variably modifying the program instructions such that the modified program instructions vary upon each execution of the method according to the preceding claims, a means for transferring the modified program instructions, and a means for verifying the obtained check value for the purpose of checking whether the program instructions have been executed by the end device, and the system further having an end device with a means for executing the modified program instructions, there being obtained by the executing of the modified program instructions a check value, a means for calling for program instructions from the trustworthy entity, and a means for transferring the obtained check value to the trustworthy entity.

Advantageously, the trustworthy entity further has means for randomizing the program instructions and/or means for computing and storing a hash value of the modified program instructions. The hash value is employed here for verifying the obtained check value.

Further, the trustworthy entity of the system according to the invention has a random number generator, the variable modifying being effected through incorporating of a generated random number.

A trustworthy entity preferably involves data carriers having corresponding security functionalities, such as e.g. smart cards, chip cards, tokens, mass memory cards, multimedia cards, subscriber identification cards in a mobile radio network.

The trustworthy entity is designed in particular as a hardware component and arranged in the mobile end device as a firmly integrated component, it either being not removable from the mobile end device in this form, for example as an M2M module, co-processor or trusted base, or being connected to the mobile end device as a removable module with security functionality, for example as a chip card, in particular a Subscriber Identification Module, SIM card for short, smart card, mass memory card, USB token, multimedia card, Secure MicroSD card, mobile radio network token, e.g. a UMTS Internet stick. Alternatively, the trustworthy entity is designed as a software component in the form of a Trusted Platform Module as a trustworthy part of the operating system kernel of the mobile end device or as a security software algorithm.

The TPM-similar trustworthy entities check in general the system integrity of an electronic device by device-neutral and user-neutral data of the device, which do not permit an identification of the device or the user, being collected, evaluated and passed on. Such device-specific data which are associated uniquely with the device due to their nature or via their presence in the trustworthy entity can thus show the trustworthiness of the end device vis-à-vis third parties, but they do not make it possible to draw any conclusion about the concrete end device and in particular its user.

DESCRIPTION OF THE DRAWINGS

Hereinafter the invention, or further embodiments and advantages of the invention, will be explained more closely on the basis of figures, the figures merely describing embodiment examples of the invention. Identical components in the figures are provided with identical reference signs. The figures are not to be considered true to scale; individual elements of the figures may be represented with exaggerated size or exaggerated simplicity.

There are shown.

DETAILED DESCRIPTION OF PREFERRED EMBODIMENTS

Figure 1:
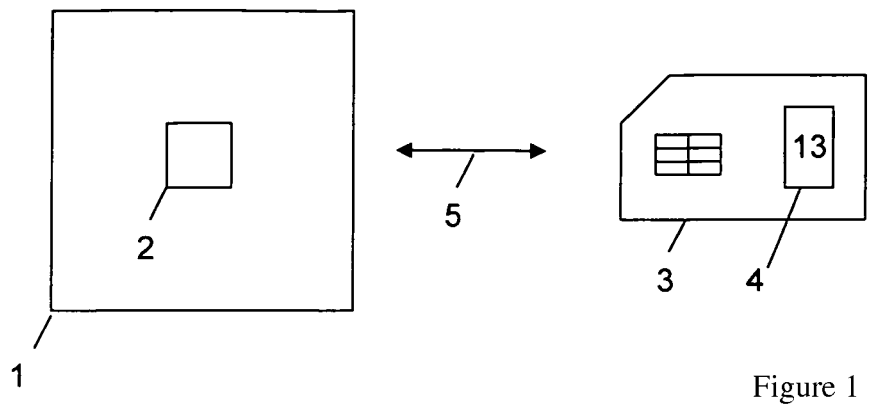
FIG. 1 a schematic representation of the system according to the invention for checking whether program instructions have been executed in an end device.

FIG. 1 shows a sketched representation of a system according to the invention. An end device 1 has herein a central processing unit 2, CPU for short. The end device is preferably a portable end device, in particular a mobile radio end device. Further functional groups of the end device 2 have for clarity's sake not been represented. The CPU 2 of the end device 1 is able to process program instructions. For this purpose one might use infrastructures well enough known from the prior art. The system furthermore has a trustworthy entity 3, here by way of example a SIM card 3 of the mobile radio end device 1. Alternatively, the trustworthy entity is a trustworthy software component of an operating system kernel, such as for example MobiCore®. In the SIM card 3 or the MobiCore® there is located, inter alia, a memory area 4. The trustworthy entity 3 and the end device 1 furthermore possess communication interfaces, for example contact-type or contactless, for setting up a data communication 5 between end device 1 and trustworthy entity 3.

In the memory area 4 of the trustworthy entity 3 there is contained at least a portion of the program instructions 13 which are executed in the CPU 2 of the end device 1. Program instructions 13 are understood to be a sequence of machine-readable commands/statements or instructions, whereby the program instructions can be present in machine language, source text or byte code. Possible intermediate translation units, such as compilers, assemblers, interpreters, can additionally be provided.

In the trustworthy entity there are furthermore means for modifying called for program instructions 13 with which the executing of program instructions by the end device 1 can be checked. These means modify called for check instructions 13 in such a way that for example idle tasks 14b are inserted at arbitrary places of the called for program instructions 13, that variable values 14c, in particular random numbers, are incorporated at arbitrary places within the program instructions 13. One might likewise use check instructions 14 with which the program instructions 13 can be modified. All these measures have in common that the modifying 14 is variable, that is, when the modifying 14 is carried out again via the same called for program instructions 13, there arise differently modified program instructions 14. That is, the number or the location of the idle tasks 14b within the called for program instructions 13 is different, the random number is a different one, or the check instruction achieves a different additional effect upon executing of the modified program instructions.

In spite of the variably modified program instructions 14 the original effect of the called for program instructions 13 is always identical. Thus, a functionally identical execution of modified and non-modified program instructions 14, 13 is ensured.

In FIGS. 2 to 6 the method according to the invention will now be described.

Figure 2:
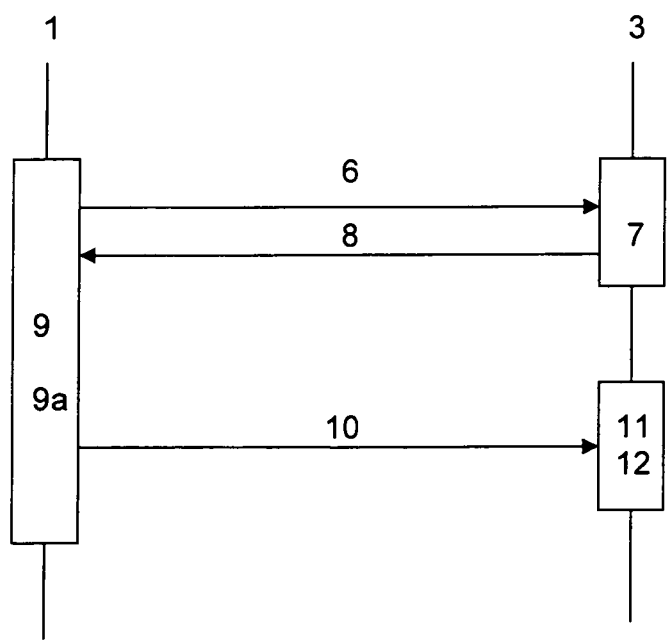
FIG. 2 a flowchart of the method according to the invention for checking whether program instructions have been executed in an end device.

In FIG. 2 there is represented a method sequence between end device 1 and trustworthy entity 2.

The end device 1 receives during the execution of program instructions the request to call for the next program instructions 13 for itself from a trustworthy entity 2 for the purpose of execution by the end device 1. Alternatively, the end device 1 receives the request to have already executed program instructions 13 checked by a trustworthy entity 3. Alternatively, the end device 1 sends at least a portion of the program instructions 13 to be executed to the trustworthy entity before execution by the end device, so that the trustworthy entity 3 need not have the program instructions 13 stored in the memory area 4.

According to arrow 6 of FIG. 2, at least a portion of the program instructions 13 is now called for by the end device. This calling can relate to a randomly selected portion of the program instructions 13, or the program instructions 13 to be executed can be transferred to the trustworthy entity as well. In the trustworthy entity the variable modifying 7 of the called for program instructions 13 is then effected. The modifying will be considered in more detail in FIGS. 3 to 6. The variably modified program instructions 14 are now transferred via the data communication 5 to the end device 1, see arrow 8. In the end device 1 the modified program instructions 14 are executed according to step 9. Due to the modification 14 a check value 9a is thereby obtained. This check value is transferred to the trustworthy entity in step 10. The check value is for example the result of an executed check instruction which has been incorporated into the program instruction 13 as a modification. Alternatively, the check value is the modification itself, for example a random number 14c or the number of incorporated idle tasks 14b. The check value can be for example the hash value or a cryptographic signature of a portion of the modified program instruction 14, or be of a portion 13a, 13b, 13c of an already executed program instruction or a program instruction yet to be executed. Likewise, the check value can be the encryption of a necessarily upcoming communication with the trustworthy entity.

In all cases, the obtained check value is verified in the trustworthy entity according to step 11. This is possible in particular by comparison of the check value 9a with an expected value of the trustworthy entity 3. The expected value was generated here for example before transfer by executing of the modified program instructions 14 in the trustworthy entity 3 and stored in the entity 3. In a simple case, expected value and checking value correspond to the modification 14.

When the check value 9a corresponds to the expected value, the trustworthy entity 3 authorizes an action in step 12. This can be for example the enabling of a network access, the signing of data, the authenticating at an eService, or much more. If the check value was not verified, the action is not authorized. This is synonymous with the finding that the called for program instructions have not been executed by the end device in this form.

Figure 3:
FIG. 3 a first embodiment example of program instructions modified according to the invention.

In FIG. 3 there is represented the principle of the modifying 14. The called for program instructions 13 are represented here as a data stream. These program instructions 13 are changed by a modification 14, and modified program instructions are obtained.

Figure 4:
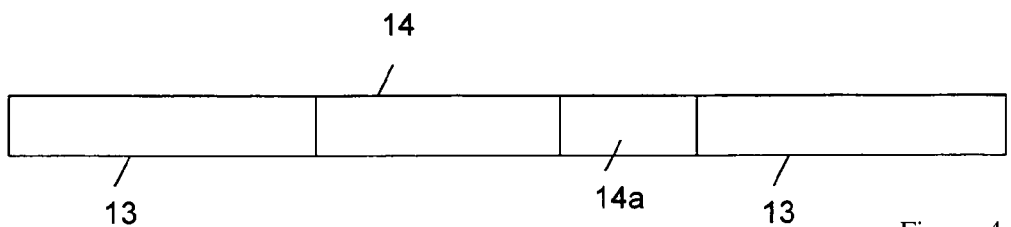
FIG. 4 a second embodiment example of program instructions modified according to the invention.

In FIG. 4 there is represented a second embodiment example of the modification 14. Here, a portion of the modification 14 is a cryptographic key 14a. This key 14a is the public part of an asymmetric key pair constructed according to the PKI infrastructure. The private part of the key is stored in the trustworthy entity 3. The key 14a is now incorporated for example into a check instruction as a modification into the called for program instructions 13. Through the execution of the modified program instructions 14 by the end device the check instruction is executed. This is for example a hash algorithm on the total data stream of FIG. 4. According to the check instruction the hash algorithm is executed on the data stream represented in FIG. 4 and a hash value obtained as the result. Upon execution of the incorporated check instruction the hash value is now first obtained as the check value 9a which is additionally encrypted with the cryptographic key 14a according to the check instruction. After transfer of the encrypted check value 9a the trustworthy entity 3 will be able to decrypt the check value by means of the private part of the key and subsequently verify the hash value.

If malware implanted third-party program instructions in the program instructions to be executed, the check value to be obtained, here the computed hash value, would first not match the expected value. Additionally, the encryption would not be effected properly or at all, so that the trustworthy entity would recognize the non-encrypted and false check value and not verify it by comparison with the expected value. Possible consequences are for example the disabling of the end device, the refusal of network access, and the like. The key 14a can also be transferred without any further check instruction as a modification 14 and the key be regarded as the precondition for a cryptographically encrypted communication between end device 1 and entity 3.

Figure 5:
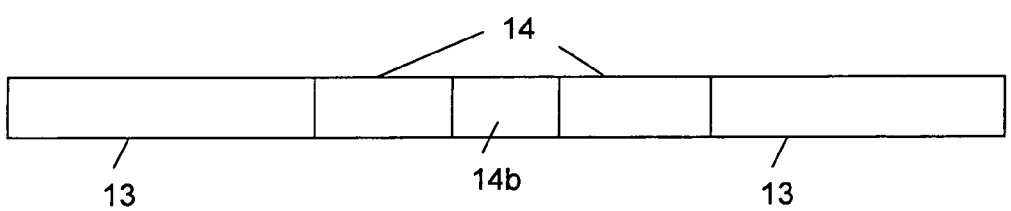
FIG. 5 a third embodiment example of program instructions modified according to the invention.

In FIG. 5 there is shown a third embodiment example of a modification 14. Here, idle tasks 14b are inserted into a portion of the modification 14. The number and the place of the inserted idle tasks 14b are random and arbitrary. Before the transfer to the end device 1 a hash value of the modified program instructions 14 is carried out in the trustworthy entity 3 and this value stored as the expected value. After transfer to the end device 1 a hash value is likewise obtained as the check value 9a of the modified program instructions 14. The entity 3 then verifies the check value in dependence on the expected value. Because number and place of the idle tasks are arbitrary, the hash value is always variable and cannot be simulated by implanted third-party program instructions. A check instruction of which portion of the modified program instruction is to be hashed can likewise be incorporated as a modification 14. Instead of idle tasks one might also use so-called nonsense commands or junk instructions, for example run through an empty program loop x times.

Figure 6:
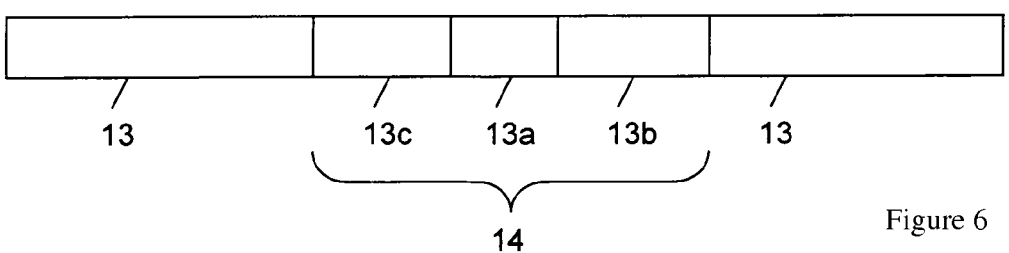
FIG. 6 a fourth embodiment example of program instructions modified according to the invention.

In FIG. 6 there is represented a fourth embodiment example of a modification 14. Here, the program instructions 13 are subdivided at least partly into portions 13a, 13b, 13c. These portions 13a, 13b, 13c are now randomized, that is, the order is interchanged in random fashion. As the check value 9a to be obtained there is to be computed here, too, a digital signature or a hash value which is verified in the trustworthy entity.

Because the interchanging of the order is random, implanted third-party program instructions cannot reproduce the expected value; hence, the verifying of the check value 9a fails.

In a variant not represented, a random value 14c is incorporated into the called for program instructions, which is then verified as the check value 9a.

All described modifications can of course be combined arbitrarily to guarantee a secure checking. Additionally, it is necessary for increasing the security to secure the transfer between end device 1 and trustworthy entity 3, for example by a further cryptographic encryption. Thus, an intercepting by implanted third-party program instructions can be ruled out.

It is likewise contained in the idea of the invention that the end device 1 transfers the program instructions to be executed before the variable modifying by the trustworthy entity 2. Because the modifying is always variable and is furthermore linked with computation steps of the end device in the form of program instructions to be executed, an intercepting and simulating of the obtained check value by third-party program instructions is not possible.

A check of the modified program instructions by the harmful third-party program instructions themselves is known in computer science as the halting problem. This problem is known to have been proved unsolvable.

LIST OF REFERENCE SIGNS

1 End device
2 CPU of end device
3 Trustworthy entity, SIM
4 Memory area of trustworthy entity
5 Data communication connection
6 Calling for program instructions
7 Variably modifying program instructions
8 Transferring modified program instructions
9 Executing modified program instructions
9a Obtaining check value
10 Transferring obtained check value
11 Verifying check value
12 Authorizing/Enabling an action
13 Program instructions
13a, b, c Portions of program instructions
14 Modification
14a Cryptographic key
14b Idle tasks
14c Variable value, random number

The invention claimed is:

1. A method for checking whether program instructions have been executed by an end device, comprising the steps:
    calling for the program instructions by the end device, the program instructions being stored in executable form in a trustworthy entity;
    variably modifying the executable program instructions by the trustworthy entity such that the modified program instructions vary upon each execution of the method;
    transferring the modified program instructions from the trustworthy entity to the end device;
    executing the modified program instructions by the end device, there being obtained by the executing of the modified program instructions a check value;
    transferring the obtained check value from the end device to the trustworthy entity; and
    verifying the obtained check value in the trustworthy entity to check whether the called for program instructions have been executed in the end device.

2. The method according to claim 1, wherein directly before or during the calling step the program instructions are transferred from the end device to the trustworthy entity.

3. The method according to claim 1, wherein the program instructions are considered executed by an end device when the check value obtained in the trustworthy entity corresponds to an expected value in the trustworthy entity.

4. The method according to claim 1, wherein at least portions of the program instructions are called for, and wherein different portions of the program instructions are called for upon each execution of the method.

5. The method according to claim 1, wherein the program instructions are variably modified through incorporating of at least one check instruction executable in the end device.

6. The method according to claim 1, wherein the program instructions are variably modified through either or both incorporating of a value, and incorporating a different number of idle instructions.

7. The method according to claim 1, wherein the variably modifying is effected through randomizing of portions of the program instructions.

8. The method according to claim 1, wherein the program instructions are variably modified such that after the executing of the modified program instructions in the end device, the transfer of the obtained check value is effected in cryptographically encrypted form, the trustworthy entity being able to decrypt the obtained check value.

9. The method according to claim 1, wherein the trustworthy entity authorizes an action as soon as the program instructions are considered executed.

10. The method according to claim 1, wherein the program instructions are the start program instructions of the end device, and the calling for the start program instructions is effected either or both during the boot and after the boot of the end device.

11. The method according to claim 1, wherein the obtained check value is a hash value of at least portions of the modified program instructions.

12. The method according to any of the preceding claims, wherein the end device is a mobile radio end device, and the trustworthy entity is a Subscriber Identification Module (SIM), and wherein the transferring is effected via an existing communication connection of the Subscriber Identification Module and the mobile radio end device.

13. A system for executing the method recited in claim 1, the system comprising:
    a trustworthy entity, comprising:
    a storage device storing program instructions to be executed in the end device;
    means for variably modifying the program instructions such that the modified program instructions vary upon each execution of the method according to the preceding claims;
    means for transferring the modified program instructions; and
    means for verifying the obtained check value for the purpose of checking whether the program instructions have been executed by the end device; and
    an end device, comprising:
    means for executing the modified program instructions, there being obtained by the executing of the modified program instructions a check value;
    means for calling for program instructions from the trustworthy entity; and
    means for transferring the obtained check value to the trustworthy entity.

14. The system according to claim 13, wherein the trustworthy entity comprises means for computing and storing a hash value of the modified program instructions, said hash value being useable to verify the obtained check value.

15. The system according to claim 13, wherein the trustworthy entity comprises a random number generator, and the variable modifying is effected through incorporating of a generated random number.

* * * * *